United States Patent [19]

Lindsey et al.

[11] Patent Number: 4,510,298

[45] Date of Patent: Apr. 9, 1985

[54] PROCESS FOR MAKING ISOCYANATE-FUNCTIONAL POLYMERS CONTAINING LOW RESIDUAL MONOMERIC ISOCYANATE

[75] Inventors: Roland G. Lindsey, Springfield, Pa.; John A. Simms, Wilmington, Del.

[73] Assignee: E. I. Du Pont de Nemours and Company, Wilmington, Del.

[21] Appl. No.: 484,558

[22] Filed: Apr. 13, 1983

Related U.S. Application Data

[63] Continuation-in-part of Ser. No. 313,585, Oct. 21, 1981, abandoned.

[51] Int. Cl.$^3$ .................... C08F 6/10; C08F 120/00
[52] U.S. Cl. ................................... 526/87; 526/312
[58] Field of Search .................... 528/491; 526/87

[56] References Cited

U.S. PATENT DOCUMENTS

| | | | |
|---|---|---|---|
| 2,662,867 | 12/1953 | Hoertz | 524/714 |
| 2,718,516 | 9/1955 | Bortnick | 526/312 |
| 3,991,136 | 11/1976 | Dalton | 525/261 |
| 4,219,632 | 8/1980 | Simms | 526/218 |
| 4,351,755 | 9/1982 | Brixius et al. | 524/555 |

Primary Examiner—Christopher A. Henderson

[57] ABSTRACT

Disclosed is an improvement in the (co)polymerization of an isocyanate-containing monomer, e.g., an isocyanatoalkyl methacrylate, forming a product of very low residual toxic monomeric isocyanate (less than 500 ppm) useful in avoiding air pollution. The improvement consists in adding a scavenger, a small amount of an active nonpolluting monomer such as butyl acrylate, near the end of the polymerization.

5 Claims, No Drawings

PROCESS FOR MAKING ISOCYANATE-FUNCTIONAL POLYMERS CONTAINING LOW RESIDUAL MONOMERIC ISOCYANATE

RELATED APPLICATION

This application is a continuation-in-part of our copending application Ser. No. 313,585, filed Oct. 21, 1981, and now abandoned.

BACKGROUND OF THE INVENTION

1. Field of the Invention

This invention relates to isocyanate-containing polymers, e.g., methacrylate of low residual monomeric isocyanate content and to their preparation by adding as a scavenger a small amount of an active monomer near the end of the polymerization process.

2. Prior Art

Bortnick U.S. Pat. No. 2,718,516 shows the preparation of some β-isocyanatoethyl methacrylate polymers.

Simms U.S. Pat. No. 4,219,632 shows the preparation of β-isocyanatoethyl methacrylate polymers of controlled low molecular weight.

Brixius and Simms U.S. Pat. No. 4,351,755 (Brixius) shows another preparation of β-isocyanatoethyl methacrylate polymers of controlled low molecular weight.

SUMMARY OF THE INVENTION

A problem in the preparation of isocyanate polymers by methods used in the art is the residual toxic monomeric isocyanate left after the polymerization reaction is complete. Optimization of the process of the Brixius patent noted above, for example, results in residual isocyanate monomer of down to about 500 ppm for the preparation concentration. While this figure is quite low, it is nevertheless desirable to lower the concentration of the monomer further because of its toxicity.

Reduction of the toxic monomeric content of an isocyanate methacrylic polymer is accomplished in the present invention by the use of a scavenger near the end of the polymerization reaction. The scavenger should be an active polymerizable monomer and here is preferably butyl acrylate. It is added in an amount at least equal to the concentration of isocyanate monomer when at least 98% of the isocyanate monomer has been polymerized.

DESCRIPTION OF THE INVENTION

In the present invention, polymers are produced between (1) at least one isocyanatoalkyl methacrylic monomer of the formula:

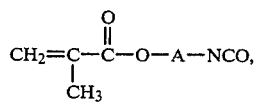

wherein A is alkylene of 2-6 carbons, and (2) optionally but preferably at least one other acrylic or vinyl monomer polymerizable therewith, preferably of the formula:

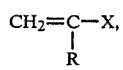

wherein
R is hydrogen or methyl and
X is phenyl, tolyl, cyano,

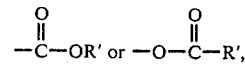

R' being alkyl of 1-8 carbons.

The polymers may be prepared by any of the methods known to the art, e.g., by batch or continuous bulk or solution polymerization as shown by Simms, or by other processes. The process of Brixius noted above, in which the polymerization is accomplished under substantially anhydrous conditions and in the presence of a mercaptan chain-transfer agent, can also be used. In the last-mentioned process, the product is polydisperse and at least partially chain terminated by a monosulfide group.

The preferred isocyanato monomer of formula (1) for use in the invention is 2-isocyanatoethyl methacrylate (IEM), although any of those of the general formula can be used. Several such isocyanate monomers can be used at one time, if desired.

The preferred monomer of formula (2) for use with the present process is styrene, but one or more other can also be used, such as 2-ethylhexyl acrylate or methacrylate or even butyl acrylate. In addition to acrylate monomers, other ethylenically unsaturated monomers such as acrylonitrile or vinyl acetate can be used.

The monomers may be polymerized in any weight ratio but usually about 27–75% of the isocyanate monomer is employed, the remainder being the other, nonisocyanato, monomer.

The process of this invention is carried out in an organic solvent calculated to yield a product of at least 50% by weight solids. Any solvent inert to the reactants, especially isocyanate, can be used. When the reaction is 98% complete, a scavenger, an active monomer that will selectively react with unreacted isocyanate faster than with itself (homopolymerize), is added. The extent of reaction can be determined in any convenient way as by direct analysis of samples. Computer simulation, however, can also be employed.

A preferred monomer for the present process is n-butyl acrylate but other monomers such as ethyl and propyl acrylates, and diethyl and dimethyl fumarates, are also useful. Since the isocyanato monomer is a methacrylate, methacrylates are not preferred.

The polymerization is preferably carried out in a continuous process in which reactants and catalysts or initiators are continuously fed into a refluxing solvent giving a final concentration of at least 50% solids. When the reactants have all been added and the reaction is 98% complete, a single addition of the scavenger monomer is made.

The scavenger should be added in an amount at least equal to the amount of monomeric isocyanate present. Preferably, at least 1.5-5 times as much scavenger as isocyanate is added.

By means of the scavenger, the residual isocyanato monomer can be reduced below 500 ppm, e.g., to between 100-500 ppm based on the concentration. This amounts to a decrease in about 20-50% by weight of the residual isocyanato monomer.

There follow a control carried out according to the procedure of Brixius and some examples of the invention. In these examples and the control, parts and percentages are in terms of weight and temperatures in degrees centigrade unless otherwise noted.

CONTROL

In a 5-liter round-bottom flask fitted for reflux with a stirrer, thermometer, nitrogen blanket and a dropping funnel, a reaction was run according to the procedure of Brixius with the following charge:

| Ingredient | Parts |
| --- | --- |
| Portion 1 | |
| Ethyl Acetate | 293.0 |
| IEM | 269.0 |
| Styrene | 249.0 |
| Portion 2 | |
| Styrene | 506.0 |
| IEM | 539.0 |
| Portion 3 | |
| Azobis(isobutyronitrile) | 35.0 |
| Cellosolve ® Acetate | 275.0 |
| Ethyl Acetate | 199.0 |
| Portion 4 | |
| n-Dodecyl Mercaptan | 175.0 |
| Portion 5 | |
| Ethyl Acetate | 729.0 |
| | 3,269.0 |

Portion 1 was charged to the flask, 15.2 parts of Portion 4 was added and reflux was begun. Portions 2, 3 and 4 were started simultaneously, Portion 2 being added over 180 minutes and Portion 3 over 380 minutes. Portion 4 was added at varying rates, 51.5 p over 0–45 minutes, 99.5 p over 45–190 minutes, and 9.8 p over 190–245 minutes. After the catalyst (Portion 4) was fed completely, reflux was continued for 40 minutes and the thinner, Portion 5 was added.

The product was a solution of the thioalkylterminated copolymer of IEM/styrene/dodecyl mercaptan of the ratio: 46/43/10, useful, for example, as a crosslinking agent: % Solids=53.68%; % NCO=6.65 (6.66; 6.64); Brookfield Viscosity=75.6 cps, 100 rpm, No. 2 spindle. The conversion of isocyanatoethyl methacrylate was 99.80%, and the product contained 500 ppm of residual IEM monomer.

EXAMPLE 1

The control run above was substantially repeated except that a new Portion 5 of the active nontoxic monomer, n-butyl acrylate, was interpolated.

The following charge was used:

| | Parts |
| --- | --- |
| Portion 1 | |
| Ethyl Acetate | 234.0 |
| IEM | 269.0 |
| Styrene | 249.0 |
| Portion 2 | |
| Styrene | 491.0 |
| IEM | 539.0 |
| Portion 3 | |
| Azobis(isobutyronitrile) | 35.0 |
| Cellosolve ® Acetate | 275.0 |
| Ethyl Acetate | 199.0 |
| Portion 4 | |
| n-Dodecyl Mercaptan | 176.0 |
| Portion 5 | |
| Butyl Acrylate | 15.0 |
| Portion 6 | |
| Ethyl Acetate | 788.0 |

| | Parts |
| --- | --- |
| -continued | |
| | 3,270.0 |

Portion 1 was added to a 5-liter flask equipped as above and reacted to 100°, 15.2 p of Portion 4 was added, and reflux was continued. Portion 2 was added over 180 minutes concomitantly with Portion 3, added over 380 minutes. The remainder of Portion 4 was added as follows: 0–45 minutes, 51.5 p; 45–190 minutes, 99.5 p; and 190–245 minutes, 9.8 p. Portion 5 was added in 5 minutes beginning at 300 minutes when 99% of the pot charge had been added and 97–98% converted. After all the catalyst feed was in, the reaction was held 40 minutes at reflux and the product thinned immediately with Portion 6. Constants of the product were: % Solids, 54.05; % NCO, 16.69, 6.67/6.68; Brookfield Viscosity, 77.6 cps, 100 rpm #2 spindle. The product was the IEM/styrene/dodecyl mercaptan copolymer (plus a small amount of butyl acrylate) having the ratio 46.46/42.55/10.12/0.87. The residual IEM monomer was only 315 ppm (290, 340 ppm) with 99.87% (99.88, 99.86%) conversion.

These figures represent a 37% reduction in residual monomeric isocyanate from the control.

EXAMPLE 2

A 2-isocyanatoethyl methacrylate/styrene copolymer was made with butyl 2-mercaptopropionate as chaintransfer agent from the following ingredients:

| | Parts |
| --- | --- |
| Portion 1 | |
| Ethyl Acetate | 240.0 |
| IEM | 276.0 |
| Styrene | 250.0 |
| Portion 2 | |
| Styrene | 513.0 |
| IEM | 558.0 |
| Portion 3 | |
| Azobis(isobutyronitrile) | 36.0 |
| Cellosolve ® Acetate | 282.0 |
| Ethyl Acetate | 204.0 |
| Portion 4 | |
| Butyl 3-Mercaptopropionate | 145.0 |
| Portion 5 | |
| Butyl Acrylate | 16.0 |
| Portion 6 | |
| Ethyl acetate | 800.0 |
| | 3320.0 |

Portion 1 was charged to a 5-1 flask and brought to reflux at about 100°. 13 p of Portion 4 (the mercaptan) was added at one time and the remainder as follows: 99.5 p over the next 65 minutes; 26.5 p over the next 45 minutes, 6 p over the next 30 minutes. Beginning with the addition of Portion 4, Portion 2 was added over 60 minutes, Portion 5 was added after 180 minutes and Portion 3 over 260 minutes. Following a hold at 100° after the complete addition of Portion 3, Portion 6 was added for dilution.

The product was a solution of an IEM/styrene/mercaptan polymer in the proporiton 47/43/812 (with about 1% initiator residue); $\overline{M}_w=6,000$; $\overline{M}_w=2,100$; % Solids=53.9; % NCO=6.67; Brookfield Viscosity=82.4 cps, 100 rps, No. 2 Spindle; Residual IEM=300 ppm.

These figures represent a 33% reduction in residual isocyanate monomer as compared with the control.

EXAMPLE 3

In a 2-1 flask fitted for polymerization, the following was reacted:

|  | Parts |
|---|---|
| Portion 1 |  |
| Cellosolve ® Acetate | 192.0 |
| Toluene | 128.0 |
| Portion 2 |  |
| IEM | 368.0 |
| Styrene | 328.0 |
| Portion 3 |  |
| 2-t-Butylazo-2-cyanobutane | 64.0 |
| Portion 4 |  |
| t-Dodecyl Mercaptan | 32.0 |
| Toluene | 32.0 |
| Portion 5 |  |
| n-Butyl Acrylate | 6.4 |
|  | 1,150.4 |

Portion 1 was put in the flask and brought to reflux (133°). Portion 2 was added over 170 minutes. Portion 3 was simultaneously added, 60 parts over 195 minutes and 4 p over the following 30 minutes. Portion 4 was added beginning 5 minutes into the run and finishing 155 minutes later. Portion 5 was added at 180 minutes and the run finished by holding 30 minutes at 130°.

All (100%) of the expected value of —NCO, 8.65% (8.65% calc.) was found with the residual IEM=500 ppm, a 17% reduction in residual monomer as compared with a control of equal nonvolatiles content.

We claim:

1. In the process of polymerizing a substantially anhydrous mixture containing at least one polymerizable monomer having the formula

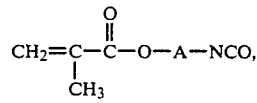

in which A is alkylene of 2-14 carbons, the monomer being polymerized alone or with at least one compound of the formula

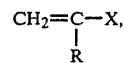

in which R is hydrogen or methyl and X is phenyl, tolyl, cyano,

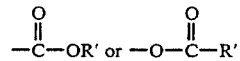

R' being alkyl of 1-8 carbons; the improvement comprising supplying to and reacting with the reacting polymerizing mixture at reaction temperature when the polymerization is about 98% complete a quantity at least equal to the quantity of unreacted isocyanate monomer of an active monomer selected from the group consisting of methyl, ethyl and butyl acrylates and fumarates.

2. The process of claim 1 wherein the polymerization mixture contains 1-20% by weight, based on the weight of the reacting monomers, of a mercaptan chain-transfer agent.

3. The process of claim 2 wherein the reacting monomers are styrene and isocyanatoethyl methacrylate.

4. The process of claim 3 employing a dodecyl mercaptan.

5. The process of claim 4 employing butyl acrylate.

* * * * *